(12) United States Patent
Ootsuki et al.

(10) Patent No.: US 8,264,558 B2
(45) Date of Patent: Sep. 11, 2012

(54) VIDEO DISPLAY APPARATUS, REMOTE CONTROLLER FOR REPRODUCTION APPARATUS, AND REPRODUCTION APPARATUS

(75) Inventors: Masaki Ootsuki, Yokohama (JP); Nobuyuki Miyake, Hiratuka (JP); Shigeru Kato, Kawasaki (JP)

(73) Assignee: Nikon Corporation, Tokyo (JP)

( * ) Notice: Subject to any disclaimer, the term of this patent is extended or adjusted under 35 U.S.C. 154(b) by 981 days.

(21) Appl. No.: 11/792,339

(22) PCT Filed: Dec. 8, 2005

(86) PCT No.: PCT/JP2005/022579
§ 371 (c)(1),
(2), (4) Date: Jun. 5, 2007

(87) PCT Pub. No.: WO2006/064717
PCT Pub. Date: Jun. 22, 2006

(65) Prior Publication Data
US 2007/0263125 A1  Nov. 15, 2007

(30) Foreign Application Priority Data
Dec. 13, 2004 (JP) .................................. 2004-359874

(51) Int. Cl.
*H04N 5/232* (2006.01)
(52) U.S. Cl. ........... 348/211.99; 348/211.8; 348/211.14; 348/734; 348/222.1
(58) Field of Classification Search .... 348/14.01–14.05, 348/114, 211.99, 211.8, 211.14, 734, 222.1
See application file for complete search history.

(56) References Cited

U.S. PATENT DOCUMENTS

| 6,346,891 | B1 | 2/2002 | Feinleib et al. |
| 6,593,941 | B1 | 7/2003 | Sameshima |
| 2002/0084929 | A1 | 7/2002 | Stefanik |
| 2003/0080866 | A1* | 5/2003 | Marmaropoulos ........... 340/540 |

FOREIGN PATENT DOCUMENTS

| JP | A-05-021592 | 1/1993 |
| JP | A-09-198177 | 7/1997 |
| JP | A-10-301548 | 11/1998 |

(Continued)

OTHER PUBLICATIONS

Jun. 29, 2012 European Search Report issued in European Patent Application No. 05 81 4372.8.

*Primary Examiner* — Yogesh Aggarwal
(74) *Attorney, Agent, or Firm* — Oliff & Berridge, PLC (57) ABSTRACT

Video display apparatus, remote controller for reproduction apparatus, and reproduction apparatus meeting user's usage conditions with high operability have structure including: remote controller for video display apparatus, the remote controller having connection section connected to video display section, operation members receiving operations by user to the video display section, and control section having at least two action modes for operating the video display section responding to operations to the operation members; attachment member attaching the remote controller for video display apparatus to user's clothes etc.; and determination section determining whether the remote controller for video display apparatus is attached to the clothes by the attachment member, wherein the control section selects action mode according to result of the determination to operate video display section through the connection section based on the selected action mode and making video display section display images of the operation members corresponding to selected action mode.

13 Claims, 10 Drawing Sheets

FOREIGN PATENT DOCUMENTS

| | | |
|---|---|---|
| JP | A-2000-197158 | 7/2000 |
| JP | A-2000-253273 | 9/2000 |
| JP | A-2000-316194 | 11/2000 |
| JP | A-2002-040540 | 2/2002 |
| JP | 2002247673 A * | 8/2002 |
| JP | A-2002-247673 | 8/2002 |
| WO | WO 03/036673 A2 | 5/2003 |

* cited by examiner

REPRODUCTION APPARATUS etc.

FIG.10

VIDEO DISPLAY APPARATUS, REMOTE CONTROLLER FOR REPRODUCTION APPARATUS, AND REPRODUCTION APPARATUS

CROSS-REFERENCE TO RELATED APPLICATION

This application is a U.S. National Stage application claiming the benefit of prior filed International Application Number PCT/JP2005/022579, filed Dec. 8, 2005, in which the International Application claims a priority date of Dec. 13, 2004 based on prior filed Japanese Application Number 2004-359874, the entire contents of which are incorporated herein by reference.

TECHNICAL FIELD

The present invention relates to a video display apparatus reproducing at least one of sound and video, a remote controller for a reproduction apparatus, and a reproduction apparatus.

BACKGROUND ART

Conventionally, in a reproduction apparatus (portable player) reproducing sound or video, a remote controller which is prepared separately from its main body has been widely known. Such a remote controller is connected to the main body and is often attached to a user's clothes or shoe when used (see, for example, a patent document 1).
Patent document 1: Japanese Unexamined Utility Model Application Publication No. Hei-5-21592

DISCLOSURE OF THE INVENTION

Problems to be Solved by the Invention

However, a method of using a remote controller is different depending on a user and a condition of use. For example, right and left of operation members of the remote controller when a user uses the remote controller by holding it by his/her hand are reversed from those when the user uses the remote controller by having it attached to his/her clothes.

It is an object of the present invention to provide a video display apparatus, a remote controller for a reproduction apparatus, and a reproduction apparatus that are capable of meeting conditions of use by a user and having high operability.

Means for Solving the Problems

A video display apparatus of the present invention includes: a remote controller for a video display apparatus, the remote controller having a connection section connected to a video display section, a plurality of operation members receiving operations applied by a user to the video display section, and a control section having at least two kinds of action modes for operating the video display section in response to operations to the plural operation members; an attachment member attaching the remote controller for a video display apparatus to clothes etc. of the user; and a determination section determining whether or not the remote controller for a video display apparatus is being attached to the clothes etc. of the user by the attachment member, wherein the control section selects the action mode according to a result of the determination by the determination section to operate the video display section through the connection section based on the selected action mode and to cause the video display section to display images of the plural operation members corresponding to the selected action mode.

A remote controller for a reproduction apparatus of the present invention includes: a connection section connected to a reproduction apparatus reproducing at least one of sound and video; a plurality of operation members receiving operations applied by a user to the reproduction apparatus; and a control section having at least two kinds of action modes for operating the reproduction apparatus in response to operations to the plural operation members, wherein the control section selects one of the action modes and operates the reproduction apparatus through the connection section based on the selected action mode.

Preferably, the plural operation members include operation members arranged in line symmetry, and the control section may have at least two kinds of action modes depending on which actions corresponding to operations to the operation members arranged in line symmetry differ.

Preferably, the plural operation members include operation members arranged in point symmetry, and the control section may have at least two kinds of action modes depending on which actions corresponding to operations to the operation members arranged in point symmetry differ.

Preferably, the remote controller for a reproduction apparatus includes a detection section detecting a degree to which a state of the remote controller for a reproduction apparatus is inclined from a predetermined reference state, and the control section may select the action mode according to a result of the detection by the detection section.

Preferably, the remote controller for a reproduction apparatus includes: an attachment member attaching the remote controller for a reproduction apparatus to clothes etc. of the user; and a determination section determining whether or not the remote controller for a reproduction apparatus is being attached to the clothes etc. of the user by the attachment member, and the control section may select the action mode according to a result of the determination by the determination section.

Preferably, the remote controller for a reproduction apparatus includes: an attachment member attaching the remote controller for a reproduction apparatus to clothes etc. of the user; and a receiving section receiving a user's indication indicating a direction in which the remote controller for a reproducing apparatus is attached to the clothes etc. of the user by the attachment member, and the control section may select the action mode according to the user's indication received by the receiving section.

A reproduction apparatus of the present invention includes: a reproduction section reproducing at least one of sound and video; a plurality of operation members receiving operations by a user; and a control section having at least two kinds of action modes for operating the reproduction section in response to the operations to the plural operation members, wherein the control section selects one of the action modes and operates the reproduction section based on the selected action mode.

Preferably, the plural operation members include operation members arranged in line symmetry, and the control section may have at least two kinds of action modes depending on which actions corresponding to operations to the operation members arranged in line symmetry differ.

Preferably, the plural operation members include operation members arranged in point symmetry, and the control section may have at least two kinds of action modes depending on which actions corresponding to operations to the operation members arranged in point symmetry differ.

Preferably, the reproduction apparatus includes a detection section detecting a degree to which a state of the reproduction apparatus is inclined from a predetermined reference state, and the control section may select the action mode according to a result of the detection by the detection section.

Preferably, the reproduction apparatus includes: an attachment member attaching the reproduction apparatus to clothes etc. of the user; and a determination section determining whether or not the reproduction apparatus is being attached to the clothes etc. of the user by the attachment member, and the control section may select the action mode according to a result of the determination by the determination section.

Preferably, the reproduction apparatus includes: an attachment member attaching the reproduction apparatus to clothes etc. of the user; and a receiving section receiving a user's indication indicating a direction in which the reproduction apparatus is attached to the clothes etc. of the user by the attachment member, and the control section may select the action mode according the user's indication received by the receiving section.

Effect of the Invention

According to the present invention, it is possible to provide a video display apparatus, a remote controller for a reproduction apparatus, and a reproduction apparatus that are capable of meeting conditions of use by a user and having high operability.

BRIEF DESCRIPTION OF THE DRAWINGS

The nature, principle and utility of the invention will become more apparent from the following detailed description when read in conjunction with the accompanying drawings in which like parts are designated by identical reference numbers, in which.

BEST MODE FOR CARRYING OUT THE INVENTION

Hereinafter, embodiments of the present invention will be described by using the drawings.

Embodiment

In the first embodiment, a remote controller for a head-mount display (hereinafter, referred to as a "HMD") will be described as an example.

Figure 1:
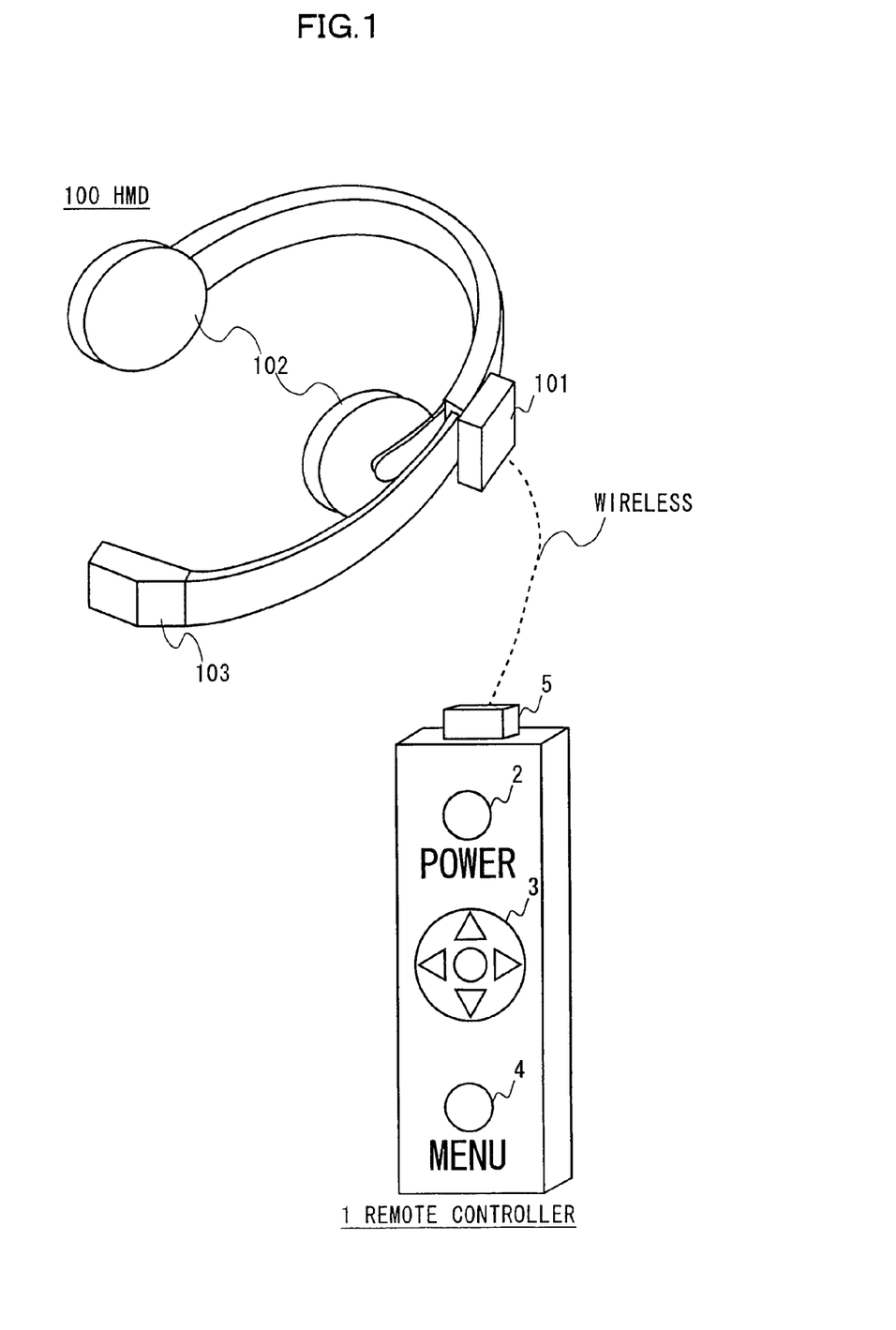
FIG. 1 is a rough view of a remote controller of a first embodiment.

FIG. 1 is a rough view of the remote controller of the first embodiment. The remote controller 1 is wirelessly connected to a HMD 100 as shown in FIG. 1. Further, the remote controller 1 includes, on a front face thereof, a power button 2, a cross button 3, and a menu button 4 and also includes, on an upper face thereof, a communication section 5. The HMD 100 includes a communication section 101, a speaker 102, and a display section 103.

Figure 2:
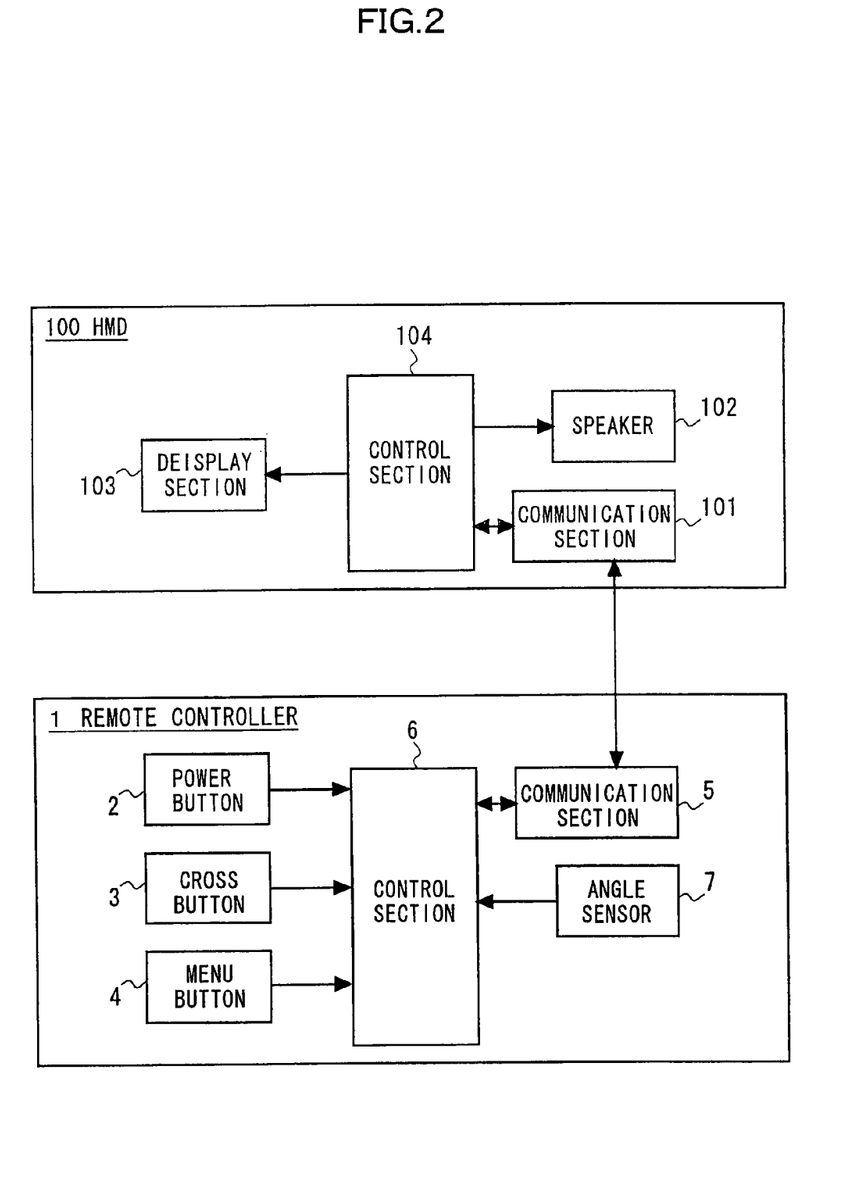
FIG. 2 is a functional block diagram of the remote controller 1 and a HMD 100.

FIG. 2 is a functional block diagram of the remote controller 1 and the HMD 100.

The remote controller 1 includes a control section 6 controlling the respective sections and an angle sensor 7 detecting a degree to which a state of the remote controller 1 is inclined from a predetermined reference state (state shown in FIG. 1).

The control section 6 detects states of the power button 2, the cross button 3, the menu button 4, and the angle sensor 7, and is mutually connected to the communication section 5.

The HMD 100 includes a control section 104 controlling the aforesaid communication section 101, speaker 102, and display section 103, and the control section 104 causes the speaker 102 to reproduce sound and the display section 103 to display images, according to an instruction sent from the remote controller 1 via the communication section 101 and the communication section 5.

The operation of the control section 6 in the remote controller 1 and the HMD 100 having the structure described above will be described.

When the power button 2 is turned on, the control section 6 detects this and gives a power-ON instruction to the control section 104 via the communication section 5 and the communication section 101. Then, the control section 6 detects, via the angle sensor 7, a degree to which the state is inclined from the predetermined reference state. Then, according to the detection result, the control section 6 selects an action mode. The action mode is a mode indicating what actions should be performed in response to operations to respective directions of the cross button 3, and the control section 6 has a plurality of action modes.

Figure 3:
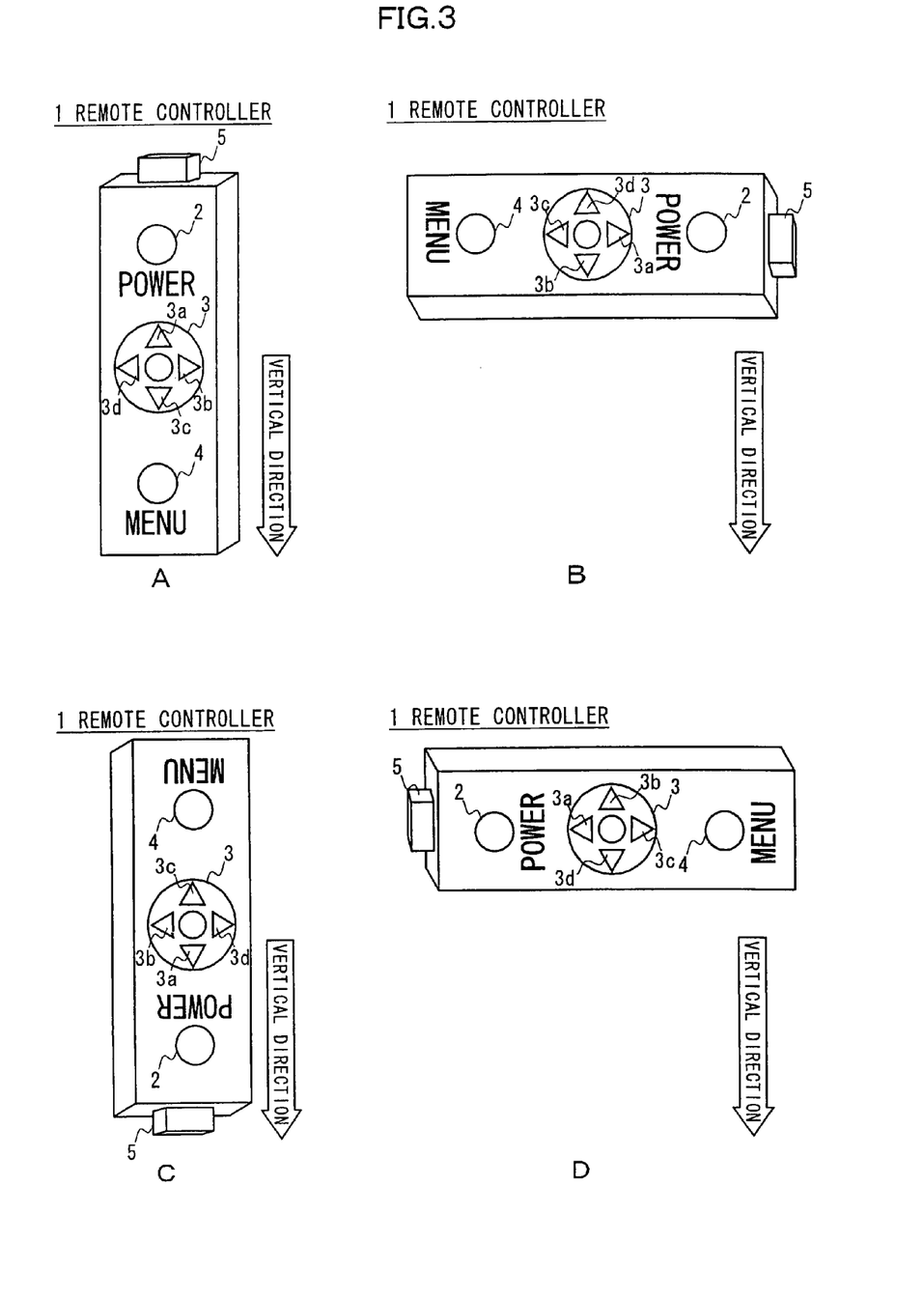
FIG. 3 are views to explain functions corresponding to respective operation members.

For example, in a case of a normal state as shown in FIG. 3A, a mode is selected in which an action of "pause" is performed in response to an operation to a member 3a set in an upward direction, an action of "fast forward" is performed in response to an operation to a member 3b set in a right direction, an action of "stop" is performed in response to an operation to a member 3c set in a downward direction, and an action of "rewind" is performed in response to an operation to a member 3d set in a left direction.

In a case of a state shown in FIG. 3B, a mode is selected in which an action of "pause" is performed in response to an operation to the member 3d set in the upward direction, an action of "fast forward" is performed in response to an operation to the member 3a set in the right direction, an action of "pause" is performed in response to the member 3b set in the downward direction, and an action of "rewind" is performed in response to an operation to the member 3c set in the left direction. The same applies to the states shown in FIG. 3C and FIG. 3D. That is, according to an output of the angle sensor 7, the condition of use is conjectured, and the same function is always assigned to any member that is set on an upper side for a user (upward direction with respect to a vertical direction). The respective directions of the cross button 3 are operation members arranged in point symmetry, and the action modes corresponding to FIG. 3A to FIG. 3D are action modes depending on which actions corresponding to operations to the operation members arranged in point symmetry differ. Incidentally, this is also applicable to operation members involved in a direction instruction, in the same manner as applied to the respective directions of the cross button 3.

Further, the control section 6 instructs the control section 104 via the communication section 5 and the communication section 101 how the functions corresponding to the respective directions of the cross button 3 should be combined. That is, according to the output of the angle sensor 7, the control section 6 instructs which functions should be assigned to the respective directions (3a~3d) of the cross button 3. When obtaining this information, the control section 104 causes the display section 103 to display the directions (3a~3d) of the cross button 3 and the functions corresponding to the respective directions. By such processing, it is possible to make the information displayed on the display section 103 and the operation by the remote controller 1 match each other, which can improve operability when a user operates the remote controller 1.

As described above, according to the first embodiment, the remote controller is connected to a reproduction apparatus reproducing at least one of sound and video, and includes: a plurality of operation members receiving operations applied by a user to the reproduction apparatus; and a control section having at least two kinds of action modes for operating the reproduction apparatus in response to operations to the plural operation members, and the control section selects one of the action modes to operate the reproduction apparatus through the connection section based on the selected action mode. Therefore, it is possible to realize a remote controller for a reproduction apparatus capable of meeting conditions of use by a user and having high operability.

Further, according to the first embodiment, the plural operation members include operation members arranged in point symmetry, and the control section has at least two kinds of action modes depending on which actions corresponding to operations to the operation members arranged in point symmetry differ. Therefore, it is possible to realize a remote controller for a reproduction apparatus adaptable to the angle of the remote controller and having higher operability.

Further, the first embodiment includes a detection section detecting a degree to which a state of the remote controller is inclined from a predetermined reference state, and the control section selects the action mode according to a result of the detection by the detection section. Therefore, it is possible to realize a remote controller for a reproduction apparatus more accurately detecting the conditions of use and having high operability.

The first embodiment shows the example where the angle sensor 7 detects the angle in a unit of 90 degrees, but it should be noted that a unit of the angle detection is not limited to this example. For example, the angle may be detected in more detailed unit.

Second Embodiment

A second embodiment will describe, as an example, a sound reproduction apparatus including—operation members in a reproduction apparatus main body (a remote controller integrated type).

Figure 4:
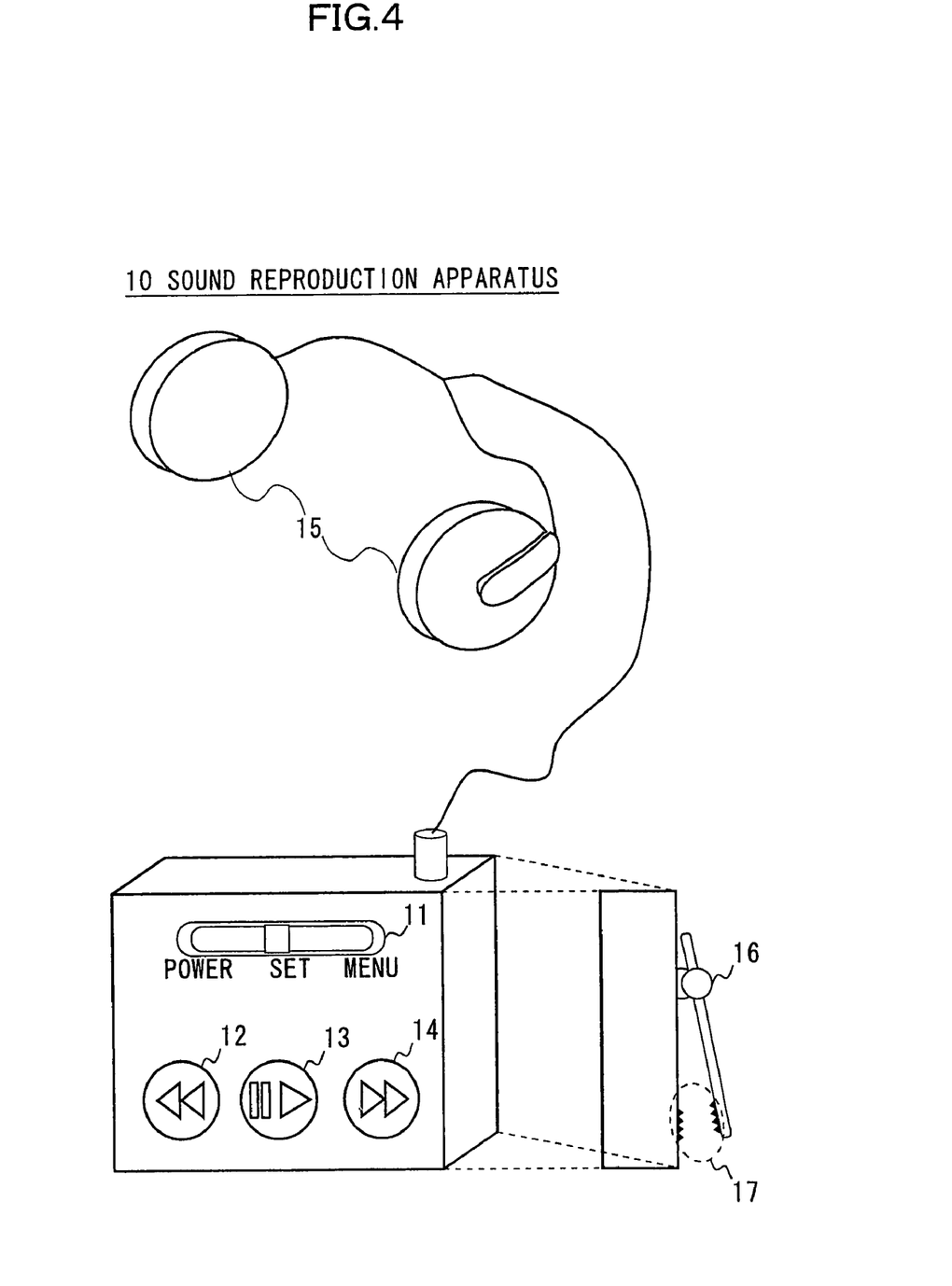
FIG. 4 is a rough view of a sound reproduction apparatus of a second embodiment.

FIG. 4 is a rough view of the sound reproduction apparatus of the second embodiment. As shown in FIG. 4, the sound reproduction apparatus 10 includes, on a front face thereof, a slide button 11, a left button 12, a center button 13, and a right button 14, and also includes a speaker 15 connected to the main body via a cord. The sound reproduction apparatus 10 further includes, on a back face thereof, a clip 16 attached to clothes etc. of a user. The clip 16 includes a clip sensor 17 in portions which come into contact with each other when the clip 16 is closed, and this clip sensor 17 determines that the sound reproduction apparatus 10 is not attached to the clothes etc. when nothing is sandwiched between the contact portions, and determines that the sound reproduction apparatus 10 is attached to the clothes etc. when the clothes etc. is sandwiched between the contact portions.

Figure 5:
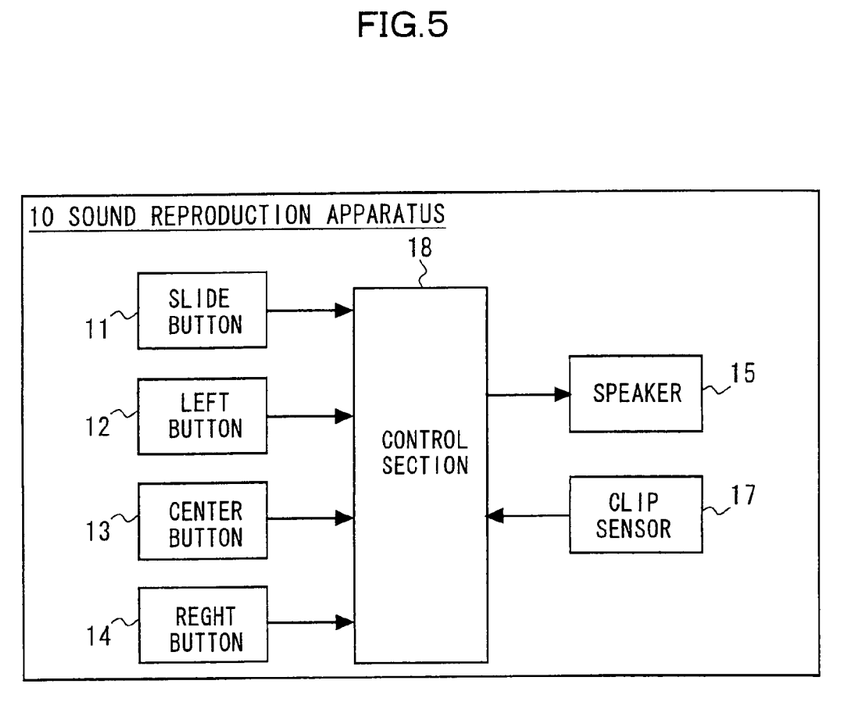
FIG. 5 is a functional block diagram of the sound reproduction apparatus 10.

FIG. 5 is a functional block diagram of the sound reproduction apparatus 10.

The sound reproduction apparatus 10 further includes a control section 18 controlling the respective sections. The control section 18 detects states of the slide button 11, the left button 12, the center button 13, the right button 14, and the clip sensor 17, and also causes the speaker 15 to reproduce sound according to instructions given via the respective operation members.

The operation of the control section 18 in the sound reproduction apparatus 10 having the above-described structure will be described.

When "POWER" is selected by the slide button 11, the control section 18 detects this to turn on the power. Then, the control section 18 determines, via the clip sensor 17, whether or not the reproduction apparatus 10 is attached to the clothes etc. of the user. By such determination, the control section 18 determines whether the user is using the reproduction apparatus 10 by holding it by his/her hand or by having it attached to his/her clothes etc., and selects the action mode according to the determination result. The action mode is a mode indicating what actions should be performed in response to the operations to the left button 12 and the right button 14, and the control section 18 has a plurality of action modes.

For example, when the user is using the reproduction apparatus 10 by holding it by his/her hand, a mode is selected in which an action of "rewind" is performed in response to the operation to the left button 12 set in a left direction, an action of "fast forward" is performed according to the operation to the right button 14 set in a right direction, and an action of "reproduction and pause" is performed in response to the operation to the center button 13 set at the center.

On the other hand, when the reproduction apparatus 10 is attached to the clothes (a breast pocket or the like) for use, the left and right are reversed. That is, for the user, the right button 14 is set in the left direction and the left button 12 is set in the right direction. Therefore, in such a case, a mode is selected in which an action of "rewind" is performed in response to the operation to the right button 14 set in the left direction, an action of "fast forward" is performed in response to the operation to the left button 12 set in the right direction, and an action of "reproduction and pause" is performed in response to the operation to the center button 13 set at the center as in the case where the reproduction apparatus 10 is held by the hand for use.

That is, according to the output of the clip sensor 17, the condition of use is conjectured, and out of the members arranged in the left and right directions, any member set in the same direction for a user is always assigned the same function. The left button 12 and the right button 14 are operation members arranged in line symmetry, and the aforesaid two kinds of action modes are action modes depending on which actions corresponding to operations to the operation members arranged in line symmetry differ. Incidentally, this is similarly applicable to operation members arranged in bilateral symmetry. For example, this is similarly applicable to the slide button 11 and the like shown in FIG. 4.

Another possible structure is to receive a user's indication indicating the direction in which the sound reproduction apparatus 10 is attached to the clothes etc. of the user by the clip 16 and decide the functions corresponding to the operation members according to the received user's indication. For example, the functions may be decided by determining the overlapping direction of a front placket of the clothes based on sex received from the user. Further, by taking the output of the angle sensor 7 described in the first embodiment into consideration, it is possible to more accurately recognize the condition of use.

As described above, the second embodiment includes: a reproduction section reproducing at least one of sound and video; a plurality of operation members receiving operations of a user, and a control section having at least two kinds of action modes for operating the reproduction section in response to operations to the plural operation members, and the control section selects one of the action modes and operates the reproduction section based on the selected mode. Therefore, it is possible to realize a reproduction apparatus capable of meeting the conditions of use by a user and having high operability.

Further, the second embodiment includes operation members arranged in line symmetry, and the control section has at least two kinds of action modes depending on which actions corresponding to operations to the operation members arranged in line symmetry differ. Therefore, it is possible to realize a reproduction apparatus capable of easily meeting the conditions of use and having high operability.

Further, the second embodiment includes: an attachment member attaching the reproduction apparatus to clothes etc. of the user; and a determination section determining whether or not the reproduction apparatus is being attached to the clothes etc. of the user by the attachment member, and the control section selects the action mode according to a result of the determination. Therefore, it is possible to realize a reproduction apparatus which easily determines whether the user is using the reproduction apparatus by holding it by his/her hand or by having it attached to his/her clothes etc. and which has high operability.

Incidentally, the second embodiment describes the example where the plural operation members are arranged in line symmetry, but is similarly applicable to the case where the plural operation members are arranged in point symmetry as in the first embodiment. Further, they may be combined depending on the arrangement and shape of the operation members. The same applies to the first embodiment. Further, to apply the present invention to all the operation members, the operation members have to be arranged symmetrically, which poses many restrictions in designing. Therefore, the present invention is preferably applied mainly to partial symmetrically arranged operation members.

Further, the second embodiment describes the sound reproduction apparatus, but may be applied to a reproduction apparatus also reproducing video as in the first embodiment.

Further, the second embodiment shows the example where the main body and the speaker of the reproduction apparatus are connected by the cord (are wire-connected), but may be wirelessly connected as in the first embodiment. Further, the remote controller and the HMD of the first embodiment may be wire-connected.

Further, the second embodiment shows the example where the reproduction apparatus is attached to clothes etc. of a user by using the clip provided on the back face of the reproduction apparatus, but the attachment member may have a shape other than the clip shape providing that it can attach the reproduction apparatus. Further, the clip does not necessarily have to be integrated with the reproduction apparatus.

Third Embodiment

In a third embodiment, a head-mount display (hereinafter, referred to as a "HMD") including a remote controller will be described as an example.

Figure 6:
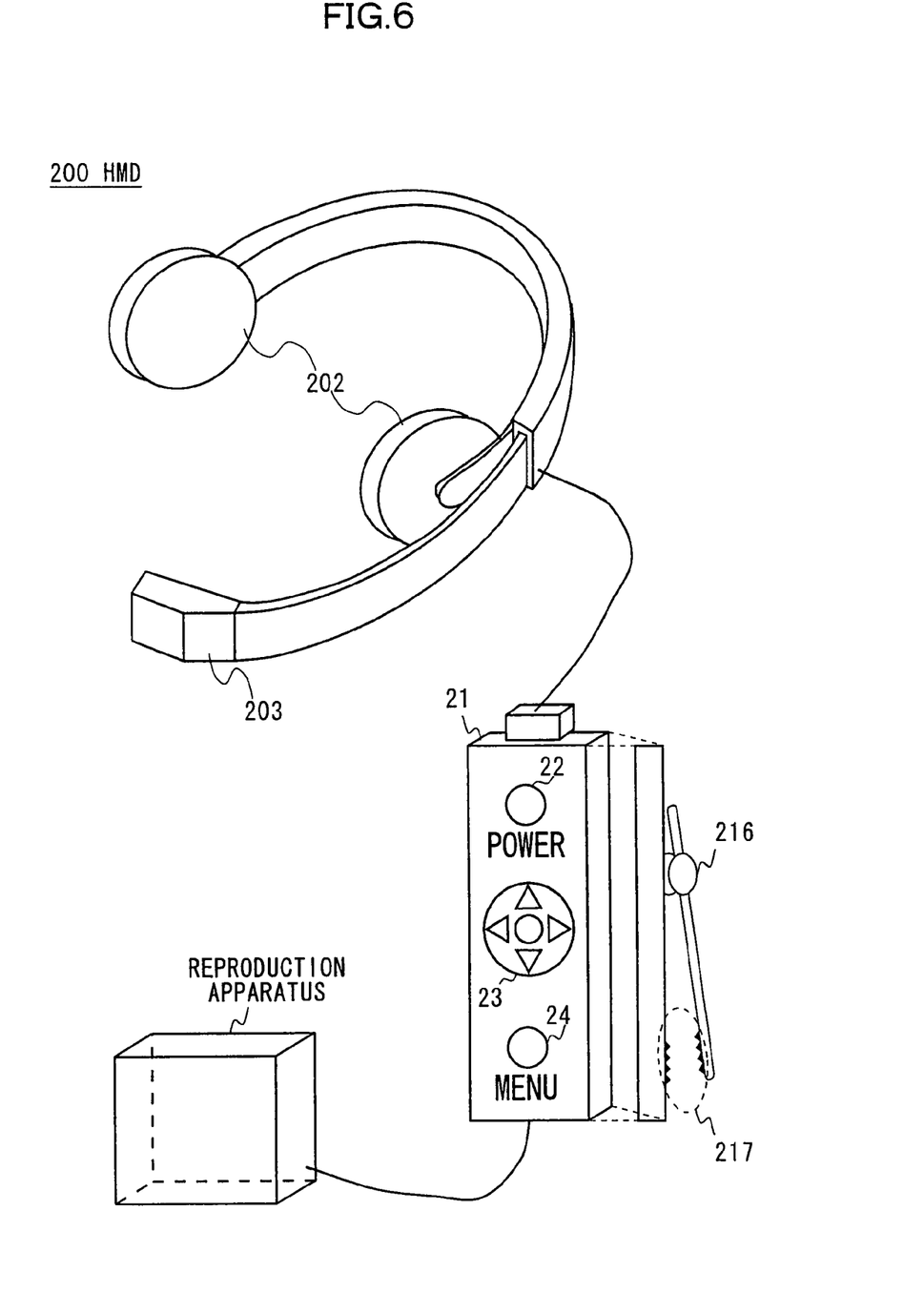
FIG. 6 is a rough view of a HMD of a third embodiment.

As shown in FIG. 6, the HMD 200 of the third embodiment includes a speaker 202, a display section 203, and a remote controller 21. As shown in FIG. 6, the remote controller 21 is connected to the HMD 200 by a cord. Similarly to the remote controller 1 of the first embodiment, the remote controller 21 includes, on a front face thereof, a power button 22, a cross button 23, and a menu button 24 and is connected to a reproduction apparatus or the like by a cord.

The remote controller 21 further includes, on a back face thereof, a clip 216 attached to clothes etc. of a user, as in the second embodiment. The clip 216 includes a clip sensor 217 in portions coming into contact with each other when the clip 216 is closed, and the clip sensor 217 determines that the remote controller 21 is not attached to the clothes etc. when nothing is sandwiched between the contact portions and determines that the remote controller 21 is attached to the clothes etc. when the clothes etc. is sandwiched between the contact portions.

Figure 7:
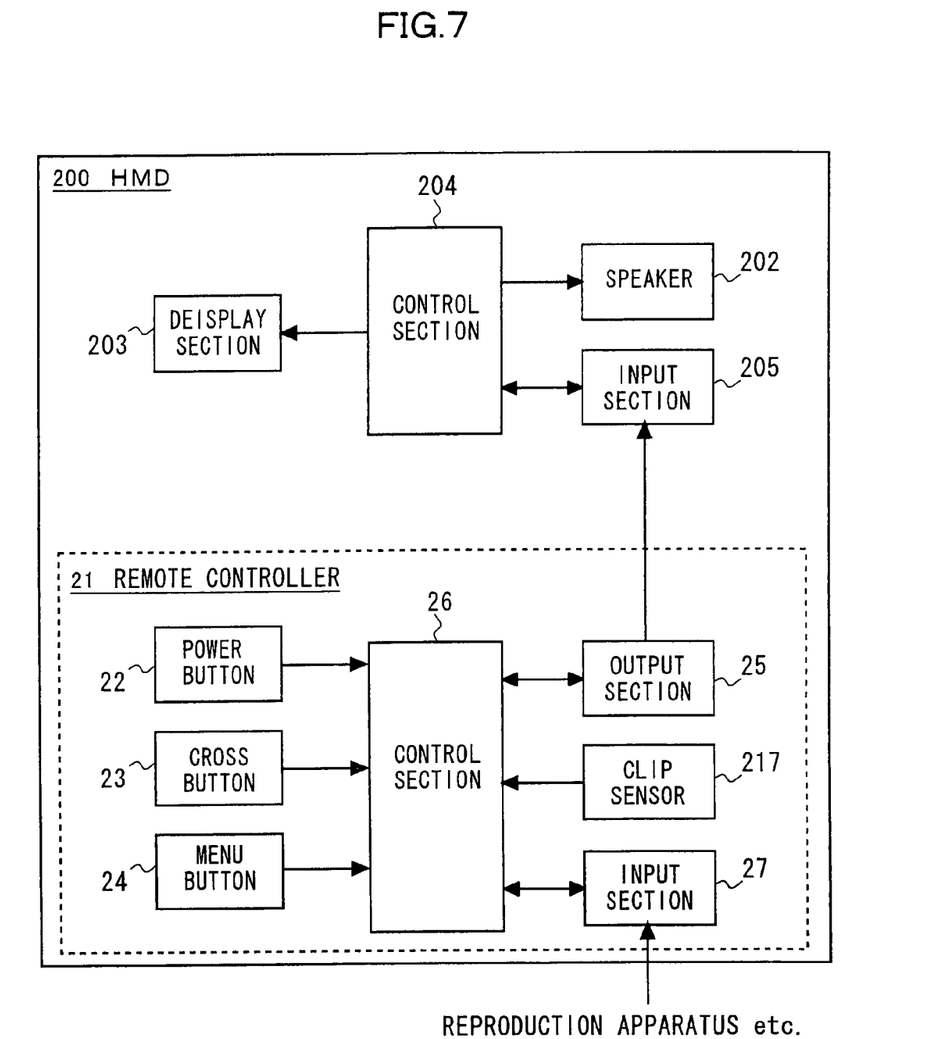
FIG. 7 is a functional block diagram of the HMD 200.

FIG. 7 is a functional block diagram of the HMD 200.

The HMD 200 further includes: a control section 204 controlling the respective sections; and an input section 205 to which information is inputted from the remote controller 21. The control section 204 causes the speaker 202 to reproduce sound and the display section 203 to display images, according to instructions from the remote controller 21 via the input section 205.

The remote controller 21 further includes: an output section 25 outputting information to the HMD 200; a control section 26 controlling the respective sections; and an input section 27 to which information is inputted from the reproduction apparatus such as a DVD player.

The control section 26 detects states of the power button 22, the cross button 23, the menu button 24, and the clip sensor 217, and is mutually connected to the output section and the input section 27.

Operations of the control section 204 and the control section 26 in the HMD 200 having the above-described structure will be described.

When the power button 22 is turned on, the control section 26 detects this and gives a power-ON instruction to the control section 204 via the output section 25 and the input section 205. Then, the control section 26 determines, via the clip sensor 217, whether or not the remote controller 21 is attached to the clothes etc. of the user. By such determination, the control section 26 determines whether the user is using the remote controller 21 by holding it by his/her hand or by having it attached to his/her clothes etc., and selects the action mode according to the determination result. The action mode is a mode indicating what actions should be performed in response to operations to keys of the cross button 23, and the control section 26 has the plural action modes.

For example, when the user is using the remote controller 21 by holding it by his/her hand, the condition of use is the same as that shown in FIG. 3A described in the first embodiment. Therefore, a mode is selected in which the same actions as performed in the state of FIG. 3A described in the first embodiment are performed.

On the other hand, when the user is using the remote controller 21 by having it attached to his/her clothes (breast pocket or the like), the up and down directions of the remote controller 21 seen from the user are reversed. That is, the condition of use in this case is the same as that in the state shown in FIG. 3C described in the first embodiment. Therefore, a mode is selected in which the same actions as performed in the state of FIG. 3C described in the first embodiment are performed.

That is, according to the output of the clip sensor 217, the condition of use is conjectured, and out of the members arranged in the left and right directions, any member set in the same direction for the user is always assigned the same function. The same applies to members arranged in the up and down directions.

Next, the control section 26 instructs the control section 204 via the output section 25 and the input section 205 how the functions corresponding to the respective directions of the cross button 23 should be combined. When obtaining this information, the control section 204 causes the display section 203 to display the respective directions of the cross button 23 and the functions corresponding to the directions.

Figure 8:
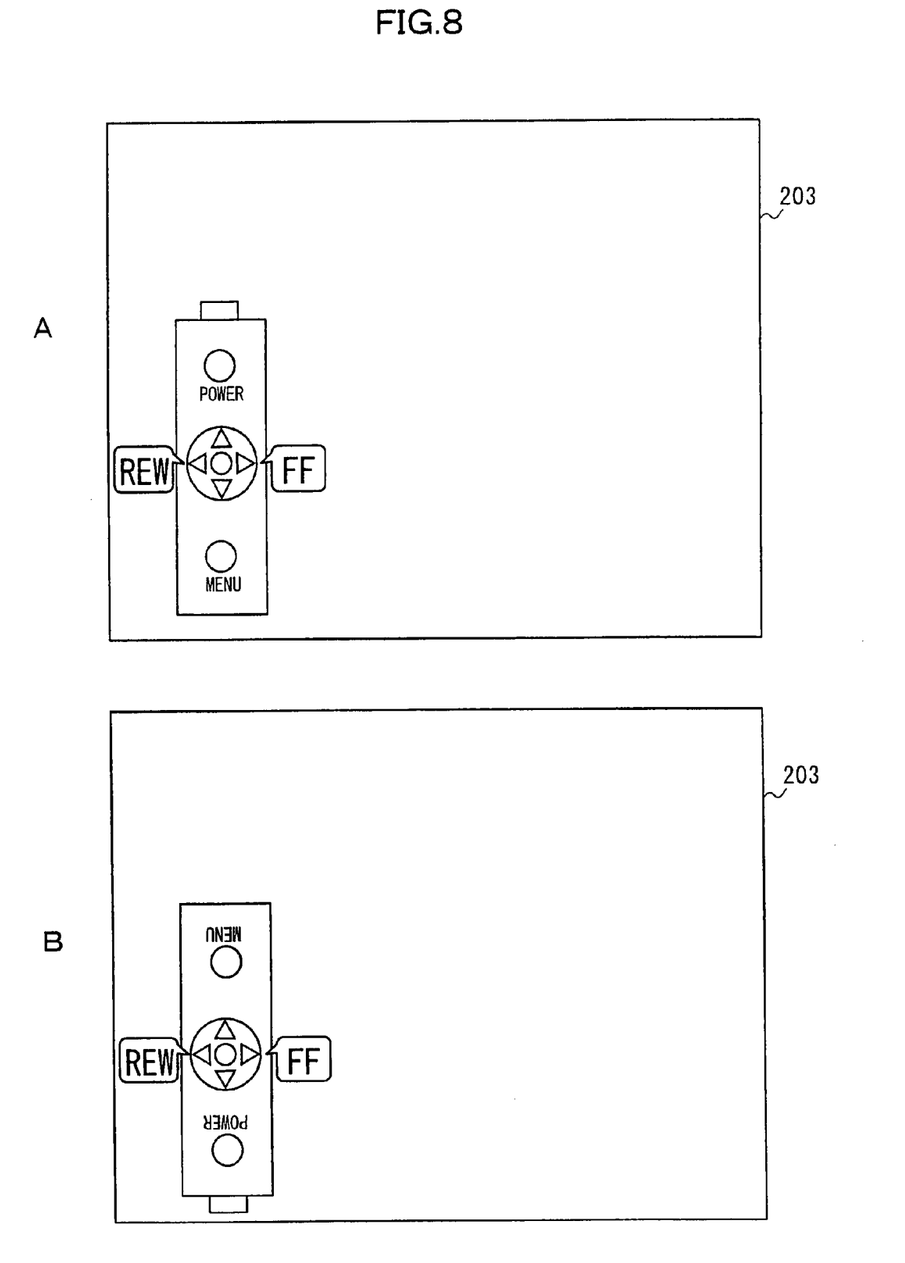
FIG. 8 are display examples of a display section 203.

FIG. 8 show display examples of the display section 203. For example, when the user is using the remote controller 21 by holding it by his/her hand, an image of the remote controller 21 corresponding to the condition of use and the functions corresponding to the respective directions of the cross buttons 23 are displayed as shown in FIG. 8A. Further, for example, when the user is using the remote controller 21 by having it attached to his/her clothes (breast pocket or the like), an image of the remote controller 21 corresponding to the condition of use and the functions corresponding to the respective directions of the cross button 23 are displayed as shown in FIG. 8B. FIG. 8A and FIG. 8B show examples where rewind and fast forward are displayed as major functions.

Figure 9:
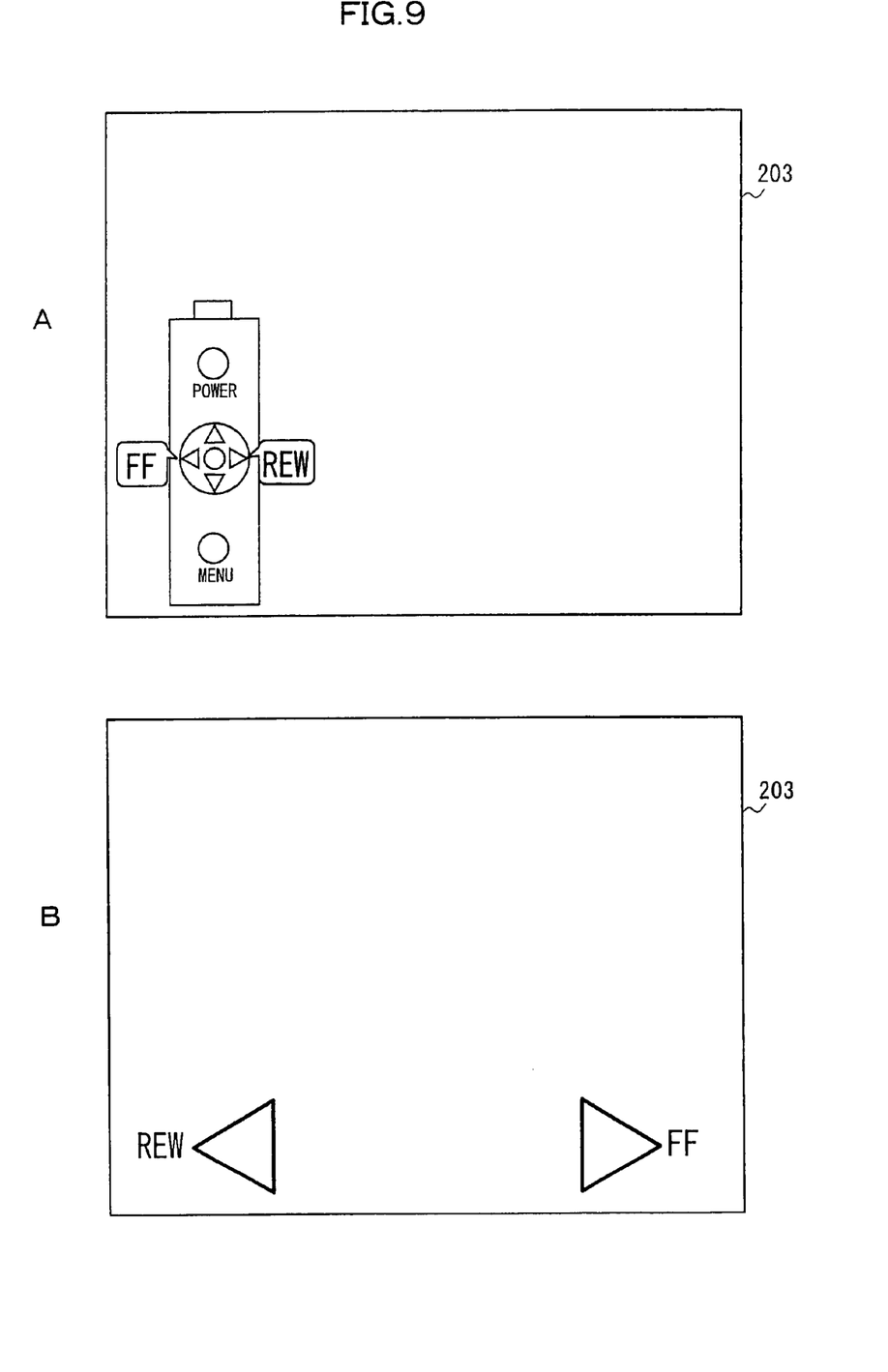
FIG. 9 are other display examples of the display section 203.

Incidentally, the display shown in FIG. 9A may replace the display shown in FIG. 8B. In the display example in FIG. 9A, the image of the remote controller 21 is displayed in the same direction as that in FIG. 8A, and the functions of the keys whose functions are changed according to the condition of use of the remote controller 21 are displayed out of the functions of the respective keys included in the cross button 23. It is preferable that a manner of display is designatable by an instruction of a user. In any case, displaying the image of the remote controller 21 and the functions corresponding to the keys enables a user to intuitively recognize the functions of the respective keys.

Incidentally, instead of displaying the whole image of the remote controller 21 as shown in FIG. 8 and FIG. 9A, some keys out of the keys of the remote controller 21 and the functions corresponding to these keys may be displayed as shown in FIG. 9B.

Figure 10:
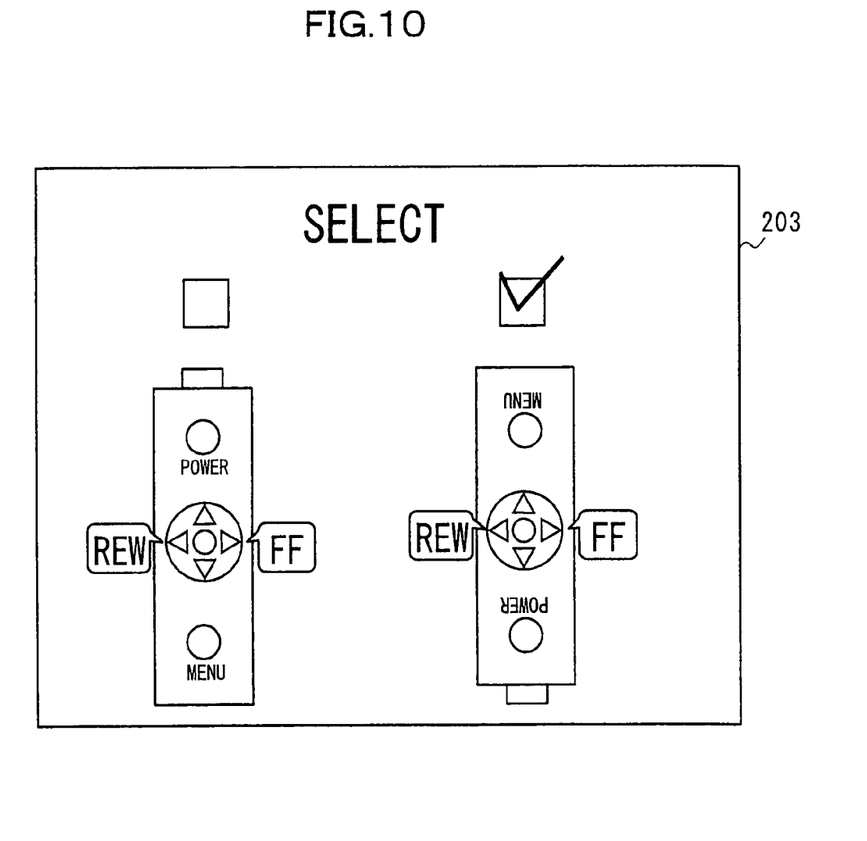
FIG. 10 is another display example of the display section 203.

Another possible structure is to make a user to select the action mode by using the display on the display section 203. For example, as shown in FIG. 10, images of the remote controller 21 in a plurality of conditions of use and the functions corresponding to the respective keys may be displayed, and based on an operation by a user via the cross button 23 or the menu button 24, the action mode may be made selectable. By such structure, it is possible to select an action mode desired by the user.

As described above the third embodiment includes: a remote controller for a video display apparatus, the remote controller having a connection section connected to a video display section, a plurality of operation members receiving operations applied by a user to the video display section, and a control section having at least two kinds of action modes for operating the video display section in response to operations to the plural operation members; an attachment member attaching the remote controller for a video display apparatus to clothes etc. of a user; and a determination section determining whether or not the remote controller for a video display apparatus is being attached to the clothes etc. of the user by the attachment member, and the control section selects the action mode according to a result of the determination by the determination section to operate the video display section through the connection section based on the selected action mode and to cause the video display section to display images of the plural operation members corresponding to the selected action mode. Therefore, a user can intuitively recognize the functions of the respective keys.

The technique described in the third embodiment is also applicable to the first embodiment and the second embodiment. That is, the display section 103 of the HMD 100 of the first embodiment may perform the similar display, or the sound reproduction apparatus 10 of the second embodiment may include a display section which performs the similar display. In any case, the same effects as those of the third embodiment can be obtained.

Further, the third embodiment describes the example where the plural operation members are arranged in point symmetry, but is also applicable to a case where they are arranged in line symmetry as in the second embodiment. Further, they may be combined depending on the arrangement and shape of the operation members. Further, to apply the present invention to all the operation members, the operation members have to be arranged symmetrically, which poses many restrictions in designing. Therefore, the present invention is preferably applied mainly to partial symmetrically arranged operation members.

Further, the third embodiment describes, as an example, the head-mount display including the remote controller, but may be applied to a reproduction apparatus reproducing images similarly to the first embodiment, or may be applied to a sound reproduction apparatus similarly to the second embodiment.

Further, the third embodiment shows the example where the remote controller 21 and the HMD 200 are connected by the cord (are wire-connected), but they may be wirelessly connected as in the first embodiment. The same applies to the remote controller 21 and the reproduction apparatus.

Further, the third embodiment shows the example where the remote controller 21 is attached to clothes etc. of a user by using the clip provided on the back face of the remote controller 21, but the attachment member may have a shape other than the clip shape providing that it can attach the remote controller 21. Further, the clip does not necessarily have to be integrated with the remote controller 21.

Further, all or part of the techniques described in the first embodiment to the third embodiment may be combined for implementing the present invention.

Further, the present invention is applicable not only to the operation members described in the first embodiment to the third embodiment but also to operation members using a touch panel technique.

The invention is not limited to the above embodiments, and various modifications may be made without departing from the spirit and scope of the invention. Any improvement may be made in part or all of the components.

The invention claimed is:

1. A video display apparatus comprising:
a remote controller for a video display apparatus, the remote controller having a connection section connected to a video display section, a plurality of operation members receiving operations applied by a user to said video display section, and a control section having at least two kinds of action modes for operating said video display section in response to operations to said plural operation members;
an attachment member attaching said remote controller for a video display apparatus to clothes etc. of said user; and a determination section determining whether or not said remote controller for a video display apparatus is being attached to the clothes etc. of said user by said attachment member, wherein said control section selects said action mode according to a result of the determination by said determination section to operate said video display section through said connection section based on the selected action mode and to cause said video display section to display images of said plural operation members corresponding to said selected action mode.

2. A remote controller for a reproduction apparatus comprising:

a connection section connected to a reproduction apparatus reproducing at least one of sound and video;

a plurality of operation members receiving operations applied by a user to said reproduction apparatus;

a control section having at least two kinds of action modes, said action modes being selectable by the user, for operating said reproduction apparatus in response to operations to said plural operation members;

an attachment member attaching said remote controller for a reproduction apparatus to clothes etc. of said user; and a determination section determining whether or not said remote controller for a reproduction apparatus is being attached to the clothes etc. of said user by said attachment member, wherein said control section selects one of said action modes and operates said reproduction apparatus through said connection section based on the selected action mode, and wherein said control section selects said action mode according to a result of the determination by said determination section.

3. The remote controller for a reproduction apparatus according to claim 2, wherein:

said plural operation members include operation members arranged in line symmetry; and said control section has at least two kinds of action modes depending on which actions corresponding to operations to said operation members arranged in line symmetry differ.

4. The remote controller for a reproduction apparatus according to claim 2, wherein:

said plural operation members include operation members arranged in point symmetry; and said control section has at least two kinds of action modes depending on which actions corresponding to operations to said operation members arranged in point symmetry differ.

5. The remote controller for a reproduction apparatus according to maintain 2, comprising a detection section detecting a degree to which a state of said remote controller for a reproduction apparatus is inclined from a predetermined reference state, wherein said control section selects said action mode according to a result of the detection by said detection section.

6. A remote controller for a reproduction apparatus, comprising:

a connection section connected to a reproduction apparatus reproducing at least one of sound and video;

a plurality of operation members receiving operations applied by a user to said reproduction apparatus; and said control section having at least two kinds of action modes, said action modes being selectable by the user, for operating said reproduction apparatus in response to operations to said plural operation members, an attachment member attaching said remote controller for a reproduction apparatus to clothes etc. of said user; and a receiving section receiving a user's indication indicating a direction in which said remote controller for a reproducing apparatus is attached to the clothes etc. of said user by said attachment member, wherein said control section selects said action mode according to said user's indication received by said receiving section, wherein said control section selects one of said action modes and operates said reproduction apparatus through said connection section based on the selected action mode.

7. A reproduction apparatus comprising:

a reproduction section reproducing at least one of sound and video;

a plurality of operation members receiving operations by a user;

a control section having at least two kinds of action modes, said action modes being selectable by the user, for operating said reproduction section in response to the operations to said plural operation members;

an attachment member attaching said reproduction apparatus to clothes etc. of said user; and a determination section determining whether or not said reproduction apparatus is being attached to the clothes etc. of said user by said attachment member, wherein said control section selects one of said action modes and operates said reproduction section based on the selected action mode, and wherein said control section selects said action mode according to a result of the determination by said determination section.

8. The reproduction apparatus according to claim 7, wherein:

said plural operation members include operation members arranged in line symmetry; and said control section has at least two kinds of action modes depending on which actions corresponding to operations to said operation members arranged in line symmetry differ.

9. The reproduction apparatus according to claim 7, wherein:

said plural operation members include operation members arranged in point symmetry; and said control section has at least two kinds of action modes depending on which actions corresponding to operations to said operation members arranged in point symmetry differ.

10. The reproduction apparatus according to claim 7, comprising a detection section detecting a degree to which a state of said reproduction apparatus is inclined from a predetermined reference state, wherein said control section selects said action mode according to a result of the detection by said detection section.

11. A reproduction apparatus comprising:

a remote controller for a reproduction apparatus, the remote controller having a connection section connected to a reproduction apparatus reproducing at least one of sound and video, a plurality of operation members receiving operations applied by a user to said reproduction apparatus, and a control section having at least two kinds of action modes, said action modes being selectable by the user, for operating said reproduction apparatus in response to operations to said plural operation members;

an attachment member attaching said remote controller for a video display apparatus to clothes etc. of said user;

a determination section determining whether or not said remote controller for a video display apparatus is being attached to the clothes etc. of said user by said attachment member; and a selection section selecting a specific action mode in response to a result of the determination by said determination means, wherein said control section operates said reproduction apparatus through said connection section based on the selected action mode.

12. A reproduction apparatus according to claim 11, comprising:

a video display section reproducing video and displaying the reproduced video, wherein said control means causes said video display section to display images of said plural operation members corresponding to said selected action mode.

13. A reproduction apparatus comprising:

a reproduction section reproducing at least one of sound and video;

a plurality of operation members receiving operations by a user;

a control section having at least two kinds of action modes, said action modes being selectable by the user, for operating said reproduction section in response to the operations to said plural operation members;

an attachment member attaching said reproduction apparatus to clothes etc. of said user; and a receiving section receiving a user's indication indicating a direction in which said reproduction apparatus is attached to the clothes etc. of said user by said attachment member, wherein said control section selects one of said action modes and operates said reproduction section based on the selected action mode, and wherein said control section selects said action mode according to said user's indication received by said receiving section.

* * * * *